(12) United States Patent
Miller

(10) Patent No.: US 9,442,697 B2
(45) Date of Patent: Sep. 13, 2016

(54) ESTABLISHMENT OF TASK AUTOMATION GUIDELINES

(75) Inventor: Brent A. Miller, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1346 days.

(21) Appl. No.: 12/437,608

(22) Filed: May 8, 2009

(65) Prior Publication Data

US 2010/0287551 A1 Nov. 11, 2010

(51) Int. Cl.
*G06F 9/30* (2006.01)
*G06F 9/44* (2006.01)

(52) U.S. Cl.
CPC ...................................... *G06F 8/10* (2013.01)

(58) Field of Classification Search
None
See application file for complete search history.

(56) References Cited

U.S. PATENT DOCUMENTS

| 7,428,495 | B2 | 9/2008 | Dhar |
| 2002/0040312 | A1* | 4/2002 | Dhar et al. ......................... 705/8 |
| 2009/0100430 | A1 | 4/2009 | Valentin et al. |

OTHER PUBLICATIONS

Kaminsky, D. et al., Policy-Based Automation in the Autonomic Data Center, Proceedings of International Conference on Autonomic Computing, 2008, Jun. 2-6, 2008, pp. 209-210.

* cited by examiner

*Primary Examiner* — Corey S Faherty
(74) *Attorney, Agent, or Firm* — Jordan IP Law, LLC

(57) ABSTRACT

A system and method of linking task automation guidelines to the tasks and activities of a process provide for receiving a definition of a process from a user. A task automation input may also be received from the user, where the task automation input corresponds to a task included in the process. Task automation guidelines can be added to the definition of the process based on the task automation input.

18 Claims, 2 Drawing Sheets

ESTABLISHMENT OF TASK AUTOMATION GUIDELINES

BACKGROUND

1. Technical Field

Embodiments of the present invention generally relate to task automation. More particularly, embodiments of the invention relate to the linking of task automation guidelines to the tasks and activities of an automated process.

2. Discussion

In information technology (IT) service management, IT management processes can be partitioned into activities, which may further be partitioned into tasks. For example, in a typical change management process, activities or tasks might include approving, scheduling, implementing and verifying a change. As systems and services management tools become more sophisticated, task automation may become more realistic. In fact, automation can be a key factor in improving the effectiveness and efficiency of systems and services management, and may decrease operational (primarily labor) expenses.

Flexible automation capabilities might enable organizations and individuals to choose the level of automation for a particular task at a particular time. Determining the appropriate level of automation for a particular task, however, may not be straightforward. For example, such a determination might involve an ad hoc procedure that is based on an administrator's experience, or it might be encoded in a policy. In either case, the automation determination may not be linked to the intent of the person who designed the process. Even when encoded in a policy, the determination of automation is likely to be based on the judgment of IT operations staff rather than the intent of the process designer.

BRIEF SUMMARY

Embodiments of the present invention provide for a computer-implemented method that involves receiving a definition of a process from a user. A task automation input may also be received from the user, where the task automation input can correspond to a task included in the process. The method can also provide for adding task automation guidelines to the definition of the process based on the task automation input.

Embodiments of the present invention also provide for a computer program product having a computer readable medium and computer usable code stored on the computer readable medium. If executed by a processor, the computer usable code may cause a computer to receive a definition of a process and a task automation input from a user, where the task automation input is to correspond to a task included in the process. The computer usable code may also cause a computer to add task automation guidelines to the definition of the process based on the task automation input.

Other embodiments of the present invention may also provide for a computer-implemented method that involves receiving a definition of a change process from a user, wherein the change process includes at least one of an approval task, a scheduling task, an implementation task and a verification task. A task automation input may also be received from the user, wherein the task automation input corresponds to a task included in the change process. The task automation input could also indicate a highest recommended level of automation for the task and one or more constraints for automating the task. Task automation metadata can be added to the definition of the change process based on the task automation input.

Other embodiments of the present invention may also provide for a computer program product having a computer readable medium and computer usable code stored on the computer readable medium, where, if executed by a processor, the computer usable code can cause a computer to receive a definition of a change process from a user, wherein the change process is to include at least one of an approval task, a scheduling task, an implementation task and a verification task. The computer usable code may also cause a computer to receive a task automation input from the user, wherein the task automation input is to correspond to a task included in the change process. The task automation input may also indicate a highest recommended level of automation for the task and one or more constraints for automating the task. The computer usable code can also cause a computer to add task automation metadata to the definition of the change process based on the task automation input.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
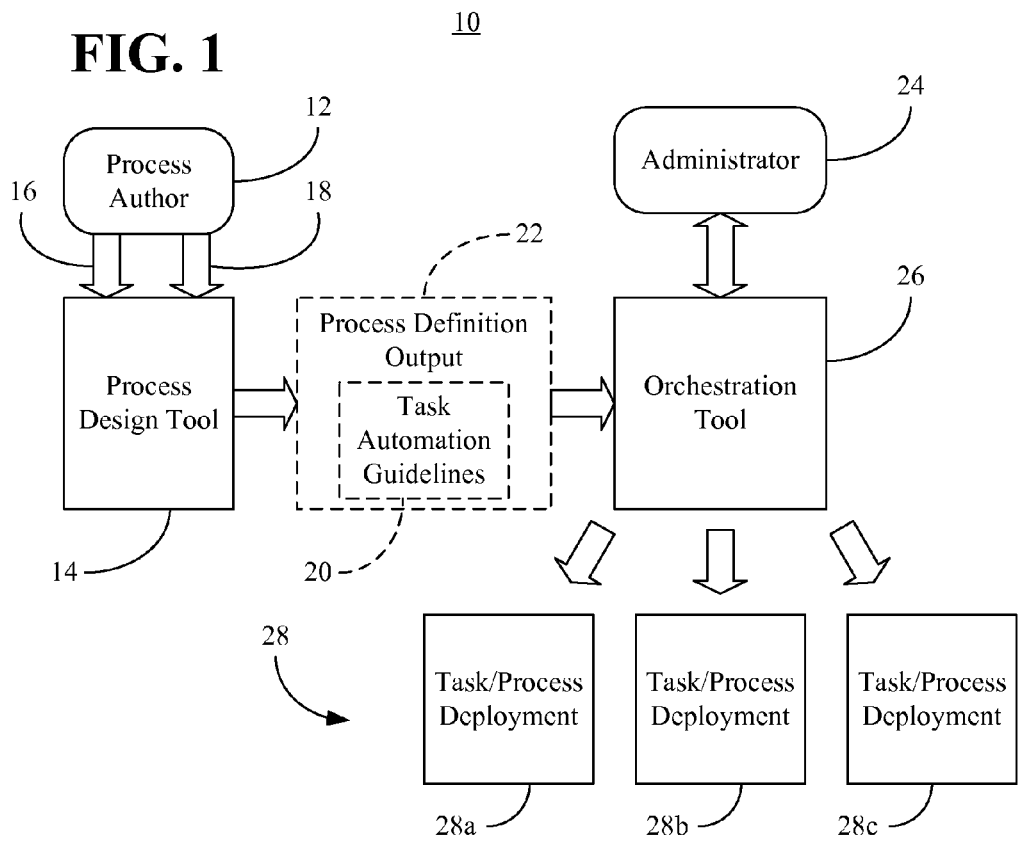
FIG. 1 is a block diagram of an example of a scheme for linking task automation guidelines to the tasks and activities of a process according to an embodiment of the present invention.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more non-transitory computer usable or computer readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device. Note that the computer-usable or computer-readable medium could even be punch-card, paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain or store the program for use by or in connection with the instruction execution system, apparatus, or device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring now to FIG. 1, a scheme 10 of linking task automation guidelines to the tasks and activities of a process is shown. In the illustrated example, a user such as a process author 12 interacts with a process design tool 14 to define, modify and/or customize a process that may be automated. The process could be a change management process (e.g., managing Microsoft Windows updates), an e-commerce process, a unified authentication process, an Information Technology Infrastructure Library (ITIL) process, or any other type of information technology (IT) related process with automation potential. Furthermore, the process may include various activities and/or tasks. For example, the change management process could involve approving, scheduling, implementing and verifying a change.

The illustrated process design tool 14 receives a definition 16 of the process from the process author 12. The process design tool 14 might implement a wide variety of process definition models, languages and techniques to facilitate the definition of the process. For example, the IBM Tivoli Unified Process (ITUP) and the Business Process Execution Language (BPEL, e.g., Oasis Standard WS-BPEL 2.0, 11 Apr. 2007) might be used to define a process in terms of its interaction with web services. Other tools, models, languages and techniques may also be used. The illustrated process design tool 14 receives a task automation input 18 from the process author 12, where the task automation input 18 can correspond to a task included in the process. As will be discussed in greater detail below, the task automation input 18 could indicate the level of automation for the task and the constraint(s) for automating the task.

The illustrated process design tool 14 is also able to add task automation guidelines 20 to the definition 16 of the process based on the task automation input 18 and generate a new and more useful process definition output 22. As discussed in greater detail below, the task automation input 18 and/or guidelines 20 may be structured in the form of metadata. The process definition output 22 may be used by one or more orchestration tools 26, under the direction of a system administrator 24 or in an automated fashion, to implement various task/process deployments 28 (28a-28c) on network resources (not shown). Because the process definition output 22 can include the task automation guidelines 20, determining the appropriate level of automation may be much more straightforward for the orchestration tools 26 and/or system administrator 24. Simply put, the illustrated approach enables automation of the tasks and activities included in a process to more closely reflect the intent of the process author 12.

For example, when composing a change management process definition, the process author 12 might indicate in the task automation input 18 that the "Approve Change" task can be automated when it involves the application of a software fix or update to a server or workstation running the Microsoft Windows operating system. This approach would allow Windows Updates to be automatically approved, but could still require human approval to, for example, roll out entire new releases of software. This level of automation would apply only to the "Approve Change" task, although the same sort of automation guidelines could be applied to other tasks associated with the change management process. For example, the author 12 could specify that Windows Updates could also be automated for the "Schedule Change" task (perhaps automatically scheduled for immediate application) and for the "Implement Change" task (perhaps automatically deployed via a management tool). Thus, varying degrees of automation can be specified by the process author 12 for various situations (e.g., sets of constraints) associated with a particular task. This enables, for example, different types of software changes to be associated with different levels of automation (ranging from fully manual tasks to automation-assisted tasks to fully automated tasks).

With regard to the specific levels of automation, the process design tool 14 might be extended to include automation level definitions such as: manual (e.g., no automation); assisted (e.g., partially automated); authorized (e.g., automated after explicit human approval; and full (e.g., fully automated). The semantic nuances of the automation levels may vary depending on the task they are associated with, but the above levels offer a conceptual framework for specifying desired or intended levels of automation. Thus, these levels are provided to facilitate discussion only, and do not limit the number of levels or attributes of the particular levels implemented.

Constraints associated with the level of automation may vary depending on the task with which they are associated. For the example of software fixes or updates for Windows servers or workstations, an illustrative set of constraints might be:

(Changetype="Fix" or Changetype="Update")
AND
(Changetarget.Os="Windows")

The syntax, values and representation of constraints can vary according to the process definition model and language. Thus, the above examples of process type and process target constraints are provided for illustration purposes only.

By capturing the illustrated automation guidelines 20 in the process definition output 22 language as metadata, the orchestration tool(s) 26 and/or administrator 24 can check the desired level of automation and invoke the appropriate capabilities in the systems management tools to accomplish the automation that is permitted.

The specified automation level may be implemented as a highest recommended level, rather than a requirement. Put another way, although the process author 12 could specify that partial or full automation is permitted, a particular task instance need not be automated. For example, at the time of deployment, a particular reason may exist for the particular task instance to be executed manually. In addition, the automation tools necessary to accomplish the automation may not be in place. Therefore, the automation metadata for the task can specify the highest level of automation that should be used for that task. Indeed, manual execution may always be an option and it might be a good practice for the default automation level to be "Manual".

Figure 2:
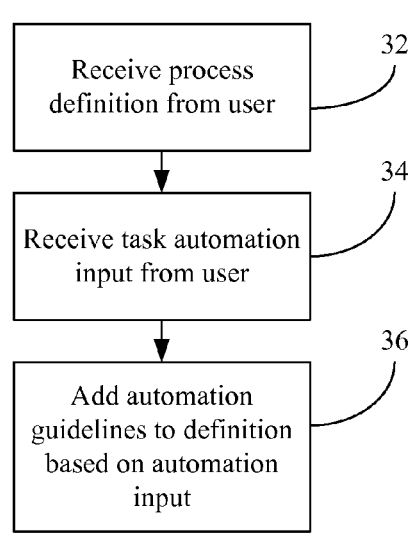
FIG. 2 is a flowchart of an example of a method of linking task automation guidelines to a process definition according to an embodiment of the present invention.

Turning now to FIG. 2, a method 30 of linking task automation guidelines to a process definition is shown. The method 30 may be implemented in a process design tool 14 (FIG. 1) as computer usable code, hardware, or any combination thereof. In the illustrated example, processing block 32 provides for receiving a definition of a process from a user. A task automation input may be received at block 34, wherein the task automation input corresponds to a task included in the process definition received in block 32. Illustrated block 36 provides for adding automation guidelines to the process definition received in block 32 based on the task automation input received in block 34. The result of processing block 36 may be the process definition output 22 (FIG. 1) that may contain task automation guidelines 20 (FIG. 1), which may be embodied as metadata.

As already noted, the illustrated approach provides additional precision about which tasks in an IT Service Management process can (and perhaps should) be automated, and can therefore enable greater effectiveness and efficiency for systems and services management. The result can be greater trust in automation. In addition, the method 30 may bridge knowledge and intent of the process designer into the IT operational environment. IT administrators can therefore use the process author's knowledge, captured as metadata associated with the process, as a guideline for automating processes (rather than using ad hoc processes to make the determination). Moreover, task-level automation information can increase the overall opportunity for automation in the managed system environment.

Figure 3:
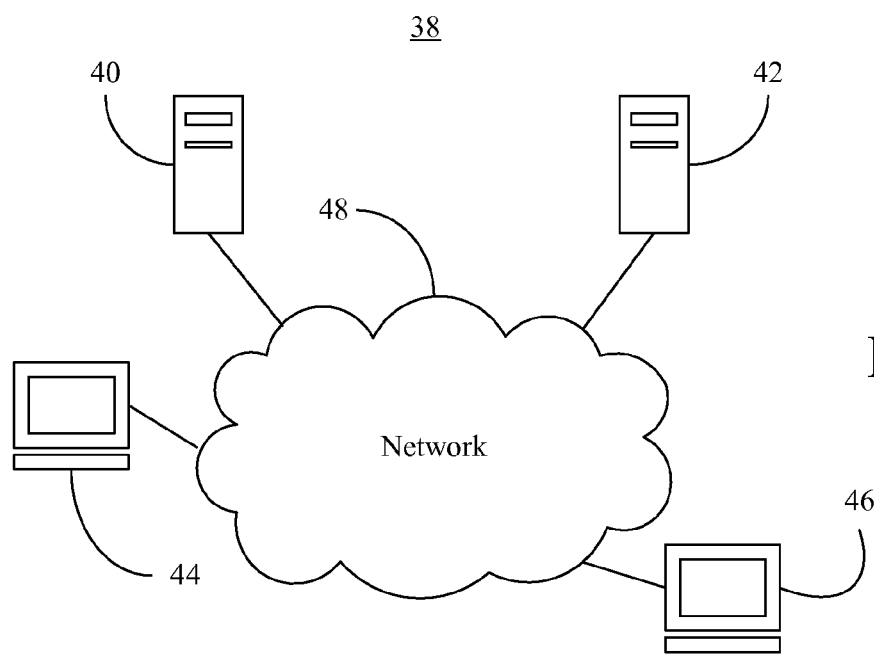
FIG. 3 is a block diagram of an example of a system according to an embodiment of the present invention.

FIG. 3 shows a system 38 with one or more servers 40, 42, and workstations 44, 46, that communicate via a network 48, which may include any suitable combination of servers, access points, routers, base stations, mobile switching centers, public switching telephone network (PSTN) components, etc., to facilitate communication between the servers 40, 42, and workstations 44, 46. The workstations 44, 46, may include any type of user equipment such as a personal computer (PC), laptop, personal digital assistant (PDA), wireless smart phone, and so on. The connection of the user equipment to the network may include a wireless data connection (e.g., IEEE 802.11, 1999 Edition, LAN/MAN Wireless LANS (WiFi), IEEE 802.16-2004, LAN/MAN Broadband Wireless LANS (WiMAX), etc.), a cellular telephone connection (e.g., W-CDMA (UMTS), CDMA2000 (IS-856/IS-2000), etc.), a wired data connection (e.g., RS-232 (Electronic Industries Alliance/EIA), Ethernet (e.g., IEEE 802.3-2005, LAN/MAN CSMA/CD Access Method), power line communication (e.g., X10, IEEE P1675), USB (e.g., Universal Serial Bus 2.0 Specification)), etc., depending upon the circumstances. Computer usable code to design, define, modify, customize and/or orchestrate processes, activities and/or tasks may be configured to run, in a distributed or centralized fashion, on the servers 40, 42, the workstations 44, 46, or any other appropriate computing platform.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

I claim:

1. A computer-implemented method comprising:
   receiving a definition of a process;
   receiving a task automation input, the task automation input corresponding to a task included in the process, wherein the task automation input is to indicate a level of automation for the task;
   adding task automation guidelines to the definition of the process based on the task automation input; and
   generating a process definition output based on the task automation guidelines, the definition of the process, and the task automation input, wherein the process definition output is to include the task automation guidelines;

wherein the process includes an authentication process that is directed to the process and further includes one or more of downloading software or installing software.

2. The method of claim 1, wherein the level of automation includes at least one of a manual level, an assisted level, an authorized level and a full level of automation, and wherein the level of automation is overridable when the process definition output is deployed.

3. The method of claim 1, wherein the level of automation indicates a highest recommended level of automation for the task, and wherein the default level is a manual level.

4. The method of claim 1, wherein the task automation input indicates one or more constraints for automating the task.

5. The method of claim 4, wherein the one or more constraints include at least one of a process type and a process target.

6. The method of claim 1, wherein receiving the definition of the process includes receiving a definition of a change process and at least one of an approval task, a scheduling task, an implementation task and a verification task.

7. A computer program product comprising:
a non-transitory computer readable medium; and
computer usable code stored on the computer readable medium, where, if executed by a processor, the computer usable code causes a computer to:
receive a definition of a process, wherein the process includes an authentication process that is directed to the process and further includes one or more of downloading software or installing software;
receive a task automation input, wherein the task automation input is to correspond to a task included in the process, and wherein the task automation input is to indicate a level of automation for the task;
add task automation guidelines to the definition of the process based on the task automation input; and
generate a process definition output based on the task automation guidelines, the definition of the process, and the task automation input, wherein the task automation guidelines include metadata, wherein the process definition output is to include the task automation guidelines.

8. The computer program product of claim 7, wherein the level of automation is to include at least one of a manual level, an assisted level, an authorized level and a full level of automation, and wherein the level of automation is overridable when the process definition output is deployed.

9. The computer program product of claim 7, wherein the level of automation is to indicate a highest recommended level of automation for the task, and wherein the default level is a manual level.

10. The computer program product of claim 7, wherein the process automation input is to indicate one or more constraints for automating the task.

11. The computer program product of claim 10, wherein the one or more constraints are to include at least one of a process type and a process target.

12. The computer program product of claim 7, wherein the computer usable code, if executed, causes a computer to receive a definition of a change process and at least one of an approval task, a scheduling task, an implementation task and a verification task.

13. A computer-implemented method comprising:
receiving a definition of a change process that includes an authentication process that is directed to the process and further includes one or more of downloading software or installing software, wherein the change process includes at least one of an approval task, a scheduling task, an implementation task and a verification task;
receiving a task automation input, wherein the task automation input corresponds to a task included in the change process, and the task automation input indicates a highest recommended level of automation for the task and one or more constraints for automating the task;
adding task automation metadata to the definition of the change process based on the task automation input; and
generating a process definition output based on the task automation metadata, the definition of the change process, and the task automation input, wherein the process definition output is to include the task automation guidelines.

14. The method of claim 13, wherein the highest recommended level of automation includes at least one of a manual level, an assisted level, an authorized level and a full level of automation, wherein the level of automation is overridable when the process definition output is deployed, and wherein the default level is the manual level.

15. The method of claim 13, wherein the one or more constraints include at least one of a process type and a process target.

16. A computer program product comprising:
a non-transitory computer readable medium; and
computer usable code stored on the computer readable medium, where, if executed by a processor, the computer usable code causes a computer to:
receive a definition of a change process that includes an authentication process that is directed to the process and further includes one or more of downloading software or installing software, wherein the change process is to include at least one of an approval task, a scheduling task, an implementation task and a verification task;
receive a task automation input, wherein the task automation input is to correspond to a task included in the change process, and the task automation input is to indicate a highest recommended level of automation for the task and one or more constraints for automating the task;
add task automation metadata to the definition of the change process based on the task automation input; and
generate a process definition output based on the task automation metadata, the definition of the change process, and the task automation input, and wherein the process definition output is to include the task automation guidelines.

17. The computer program product of claim 16, wherein the highest recommended level of automation is to include at least one of a manual level, an assisted level, an authorized level and a full level of automation, wherein the level of automation is overridable when the process definition output is deployed, and wherein the default level is the manual level.

18. The computer program product of claim 16, wherein the one or more constraints are to include at least one of a process type and a process target.

* * * * *